United States Patent
Elkhatib (10) Patent No.: US 12,204,643 B1
(45) Date of Patent: Jan. 21, 2025

(54) COMPUTER PROCESSING SYSTEM AND METHOD CONFIGURED TO PERFORM SIDE-CHANNEL COUNTERMEASURES

(71) Applicant: PQSECURE TECHNOLOGIES, LLC, Boca Raton, FL (US)

(72) Inventor: Rami Elkhatib, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 18/725,921

(22) PCT Filed: Mar. 7, 2024

(86) PCT No.: PCT/US2024/018916
§ 371 (c)(1),
(2) Date: Jul. 1, 2024

(51) Int. Cl.
*G06F 21/55* (2013.01)
*G06F 21/60* (2013.01)

(52) U.S. Cl.
CPC .......... *G06F 21/554* (2013.01); *G06F 21/602* (2013.01)

(58) Field of Classification Search
CPC .............................. G06F 21/554; G06F 21/602
USPC ........................................................ 726/23
See application file for complete search history.

(56) References Cited

U.S. PATENT DOCUMENTS

| | | | |
|---|---|---|---|
| 10,333,699 B1* | 6/2019 | Rohatgi | H04L 9/0662 |
| 2019/0074959 A1* | 3/2019 | Rietman | H04L 9/0819 |
| 2019/0116023 A1* | 4/2019 | Kumar | H04L 9/0662 |
| 2020/0076594 A1* | 3/2020 | Audley | G09C 1/00 |
| 2020/0396068 A1* | 12/2020 | Sarno | H04L 9/0894 |
| 2023/0030316 A1* | 2/2023 | Pessl | G06F 21/75 |
| 2024/0163074 A1* | 5/2024 | Wenger | H04L 9/002 |
| 2024/0176589 A1* | 5/2024 | Mendel | G06F 7/5443 |
| 2024/0220640 A1* | 7/2024 | Kuijsters | G06F 21/554 |

OTHER PUBLICATIONS

Avoiding Side-channel Attacks in Embedded Systems with Non-deterministic Branches (Year: 2010).*

* cited by examiner

*Primary Examiner* — Taghi T Arani
*Assistant Examiner* — Pegah Barzegar
(74) *Attorney, Agent, or Firm* — Johnson | Dalal; Mark C. Johnson (57) ABSTRACT

This invention presents a computer processing system and method designed to execute cryptographic operations while providing selective protection against side-channel attacks. It comprises a configuration of unprotected and protected hardware modules, the latter of which is equipped with data isolators, and a protected arithmetic logic unit (ALU) for secure data processing. The system enhances cryptographic security by selectively transmitting and computing input shares to generate side-channel protected output shares, ensuring robust protection during cryptographic operations.

14 Claims, 7 Drawing Sheets

COMPUTER PROCESSING SYSTEM AND METHOD CONFIGURED TO PERFORM SIDE-CHANNEL COUNTERMEASURES

FIELD OF THE INVENTION

The present invention relates to computer processing systems and methods, specifically to systems and methods for performing side-channel countermeasures.

BACKGROUND OF THE INVENTION

Central to contemporary encryption techniques is the practice of safeguarding information by leveraging complex mathematical challenges. These challenges are deliberately designed to be nearly insurmountable with the technology available today. Typically, a cryptographic system employs simple mathematical methods to convert confidential, hidden information into a format that is publicly accessible. The security of these methods stems from the substantial difficulty in reversing this process—that is, in deriving the original confidential information from its public counterpart. This reverse engineering is the significant mathematical obstacle that would-be attackers are faced with.

Despite their robustness, cryptographic methods are not impervious to flaws. The processing of mathematical functions within a system can unintentionally reveal critical hints. The patterns of power usage and the timing of operations might inadvertently act as conduits for the leakage of sensitive information.

A particularly effective type of attack that takes advantage of such weaknesses is known as differential power analysis (DPA). This method involves examining the variances in the power consumption patterns of encryption activities to uncover vital details about the operations and data involved. To defend against such invasive scrutiny, defensive strategies have been developed, with "masking" being a prevalent approach. This technique obscures the input information and the operations being performed, aiming to make power analysis attacks ineffective.

A prevalent technique in masking involves dispersing the sensitive input data across various shares of data, where the sum of these shares reproduces the initial sensitive data. This method entails executing all calculations on these dispersed shares within a secure environment that prevents the leakage of unmasked data, producing results in the same number of shares. The sum of these output shares, which form the unmasked output data, is deferred until the data becomes non-sensitive and public. The effectiveness of this approach in enhancing the system's resilience against sophisticated differential power analysis (DPA) attacks increases with the number of shares used.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

SUMMARY OF THE INVENTION

The present invention provides a computer processing system and method configured to perform side-channel countermeasures. With the foregoing and other objects, there is a computer processing system configured to perform a crypto operation and selectively protect against side-channel attacks and that includes at least two unprotected hardware modules each having an internal configurable hardware module and operably configured to receive an external share input forming part of at least two external input shares, receive a protected share input, and selectively, through a multiplexor, transmit the external share input or transmit a summation of the external share input and the protected share input into the internal configurable hardware module for computing a share output forming at least two side-channel protected output shares utilized in the crypto operation and having at least two protected hardware modules that each have a primary data isolator operably configured to receive the external share input forming part of the at least two external input shares to generate a primary isolated external input share, at least one secondary data isolator operably configured to receive a respective one of the remaining shares for the at least two external input shares to generate a secondary isolated external input share, and a protected arithmetic logic unit (ALU) operably configured to receive the primary isolated external input share and the secondary isolated external input shares and compute a protected share input.

In accordance with another feature, an embodiment of the present invention includes an electronic controller communicatively coupled to the multiplexor of the at least two unprotected hardware modules and operably configured to activate a protected mode causing selective transmission of the external share input directly into the internal configurable hardware module or transmission of the summation of the external share input and the protected share input into the internal configurable hardware module.

In accordance with a further feature of the present invention, the at least two external input shares are at least two independent input data and the at least two side-channel protected output shares are at least two non-side-channel protected output data and the system includes an electronic controller communicatively coupled to the multiplexor of the at least two unprotected hardware modules and operably configured to activate an unprotected mode causing transmission of the external share input directly into the internal configurable hardware module.

In accordance with an additional feature of the present invention, the protected ALU also includes at least one multiplication module operably configured to receive the primary isolated external input share and the secondary isolated external input share and compute an ALU multiplied share, at least one ALU data isolator operably configured to pass through the ALU multiplied share to generate ALU isolated multiplied share, and a summation module operably configured to receive the primary isolated external input share and the ALU isolated multiplied share to generate the protected share input.

In accordance with yet another feature of the present invention, the at least one multiplication module is an AND operation and the summation module is an XOR operation.

In accordance with another feature, an embodiment of the present invention also includes the internal configurable hardware module having an unprotected ALU operably configured to perform the following operations: XOR, BIT-CLEAR, ROTL64.

In accordance with yet another feature of the present invention, the crypto operation is one of the following: SHA-3, Keccak, or their respective derivatives.

Also in accordance with the present invention, a computer-based method of performing a crypto operation and selectively protecting against side-channel attacks is disclosed that includes the steps of transmitting a first external share input to a multiplexor of a first unprotected hardware module, the first unprotected hardware module having an internal configurable hardware module, transmitting a second external share input to a multiplexor of a second unprotected hardware module, the second unprotected hardware module having an internal configurable hardware module, transmitting the first external share input to a primary data isolator of a first protected hardware module generating a primary isolated external input share, transmitting the second external share input to a secondary data isolator of the first protected hardware module generating a secondary isolated external input share, and computing a first protected share input with a protected arithmetic logic unit (ALU) of the first protected hardware module based on the primary isolated external input share and the secondary isolated external input share, transmitting the second external share input to a primary data isolator of a second protected hardware module generating a primary isolated external input share, transmitting the first external share input to a secondary data isolator of the second protected hardware module 104n generating a secondary isolated external input share, and computing a second protected share input with a protected ALU of the second protected hardware module based on the primary isolated external input share generated in the second protected hardware module and the secondary isolated external input share generated in the second protected hardware module, and initiating a protected mode utilizing the multiplexor of the first unprotected hardware module to either transmit the first external share input into the internal configurable hardware module for computing a first share output or transmit a summation of the first external share input and the first protected share input into the internal configurable hardware module for computing the first share output and the multiplexor of the second unprotected hardware module to either transmit the second external share input into the internal configurable hardware module of the second unprotected hardware module for computing a second share output or transmit a summation of the second external share input and the second protected share input into the internal configurable hardware module of the second unprotected hardware module for computing the second share output. The method also includes utilizing the first and second share outputs as two side-channel protected output shares in the crypto operation.

In accordance with another feature, an embodiment of the present invention includes utilizing an electronic controller for initiating the protected mode by communicating a signal to the multiplexor of the first unprotected hardware module and a signal to the multiplexor of the second unprotected hardware module.

In accordance with yet another feature, an embodiment of the present invention also includes initiating an unprotected mode utilizing the multiplexor of the first unprotected hardware module to transmit the first external share input directly into the internal configurable hardware module for computing the first share output and the multiplexor of the second unprotected hardware module to transmit the second external share input directly into the internal configurable hardware module of the second unprotected hardware module for computing the second share output, wherein the first and second external share inputs are two independent input data and the first and second share outputs are two non-side-channel protected output data.

In accordance with another feature, an embodiment of the present invention includes computing an ALU multiplied share with the primary isolated external input share in the first protected hardware module and the secondary isolated external input share in a first multiplication module in the protected ALU of the first protected hardware module, generating an ALU isolated multiplied share with an ALU data isolator in the protected ALU of the first protected hardware module and utilizing the ALU multiplied share generated in the first protected hardware module, and summing the primary isolated external input share generated in the first protected hardware module and the ALU isolated multiplied share generated in the first protected hardware module to generate the first protected share input and computing an ALU multiplied share with the primary isolated external input share in the second protected hardware module and the secondary isolated external input share in a first multiplication module in the protected ALU of the second protected hardware module, generating an ALU isolated multiplied share with an ALU data isolator in the protected ALU of the second protected hardware module and utilizing the ALU multiplied share generated in the second protected hardware module, and summing the primary isolated external input share generated in the second protected hardware module and the ALU isolated multiplied share generated in the second protected hardware module to generate the second protected share input.

Although the invention is illustrated and described herein as embodied in a computer processing system and method for performing side-channel countermeasures, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic of the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. The terms "summation" and "addition" are used interchangeably herein. The terms "data share" and "share" are also used interchangeably herein.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

In crafting and elucidating the present invention, a confluence of methodologies, terminologies, and theoretical frameworks from the realms of mathematics, engineering, and cryptography have been employed. It is to be understood that customary principles within these fields are invoked herein, albeit without extensive exposition.

For example, binary Galois Field, denoted as $GF(2^n)$ are deployed for the present invention. Further, a $GF(2^n)$ block represents n bits, data can be compromised of one or more $GF(2^n)$ blocks, an addition operation is a $GF(2^n)$ addition operation on each block, while a multiplication operation is a $GF(2^n)$ multiplication operation on each block.

The addition operation takes two input data and produces one output data where the output data is the aggregation of output blocks each generated by applying $GF(2^n)$ addition on the input blocks. Since $GF(2^n)$ addition is simply an XOR operation on each bit, the addition operation on two input data can also be seen as an XOR operation on each bit of the two input data. The addition operation can easily be extended to more than two input data by XORing all the input data to generate the output.

The multiplication operation takes two input data and produces an output data where the output data is the aggregation of output blocks each generated by applying $GF(2^n)$ multiplication on the input blocks. For n=1, aka $GF(2^1)$, the multiplication operation on two input data becomes an AND operation on each bit of the two input data.

Within the scope of the present invention, data is split into two or more "data shares" where the summation of these data shares generates the original data. This split is done for side-channel purposes to mask sensitive data. A two-share system uses two shares of data to represent the original data, a three-share system uses three shares of data to represent the original data, and, in general, and m-share system uses m shares of data to represent the original data. For all intents and purposes, a data share is treated exactly like a data when operations are performed on it. Said another way, the term "external" is defined as not part of or originated in the system. For example, "data" is "external" if it is coming from outside the system. "Data share" is "data" split into multiple shares for side-channel purposes.

A data isolator is a unit that takes an input data and produces the same data as output with the output decoupled from the input. The most common approach to achieve this is by simply using a data register.

In this invention, a computer system and a method designed to execute cryptographic operations while offering selective protection against side-channel attacks are presented. This system is characterized by its unique configuration, which includes several key components designed to enhance security and efficiency in cryptographic computations. The system receives at least two external input shares and produces an equal number of external output shares. More specifically and with reference to FIGS. 1-4, a computer processing system that is configured to perform a crypto operation and selectively protect against side-channel attacks is depicted, wherein the system includes at least two unprotected hardware modules 102a-n, at least two protected hardware modules 104a-n, and a protected arithmetic logic unit (ALU) 304 that are utilized to generate a plurality of external share outputs, wherein "n" represents any number greater than one.

Figure 1:
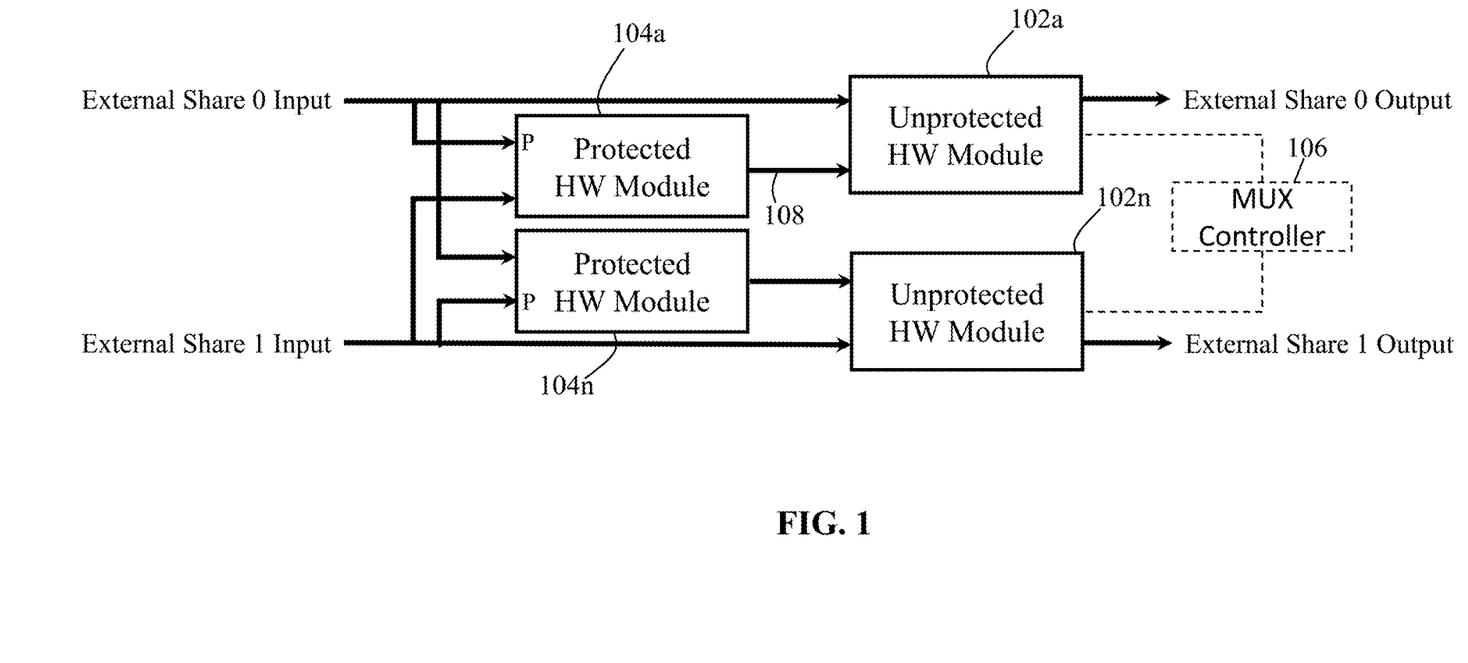
FIG. 1 is a diagram depicting the top-level view of a two-share system in accordance with one embodiment of the present invention.
Figure 2:
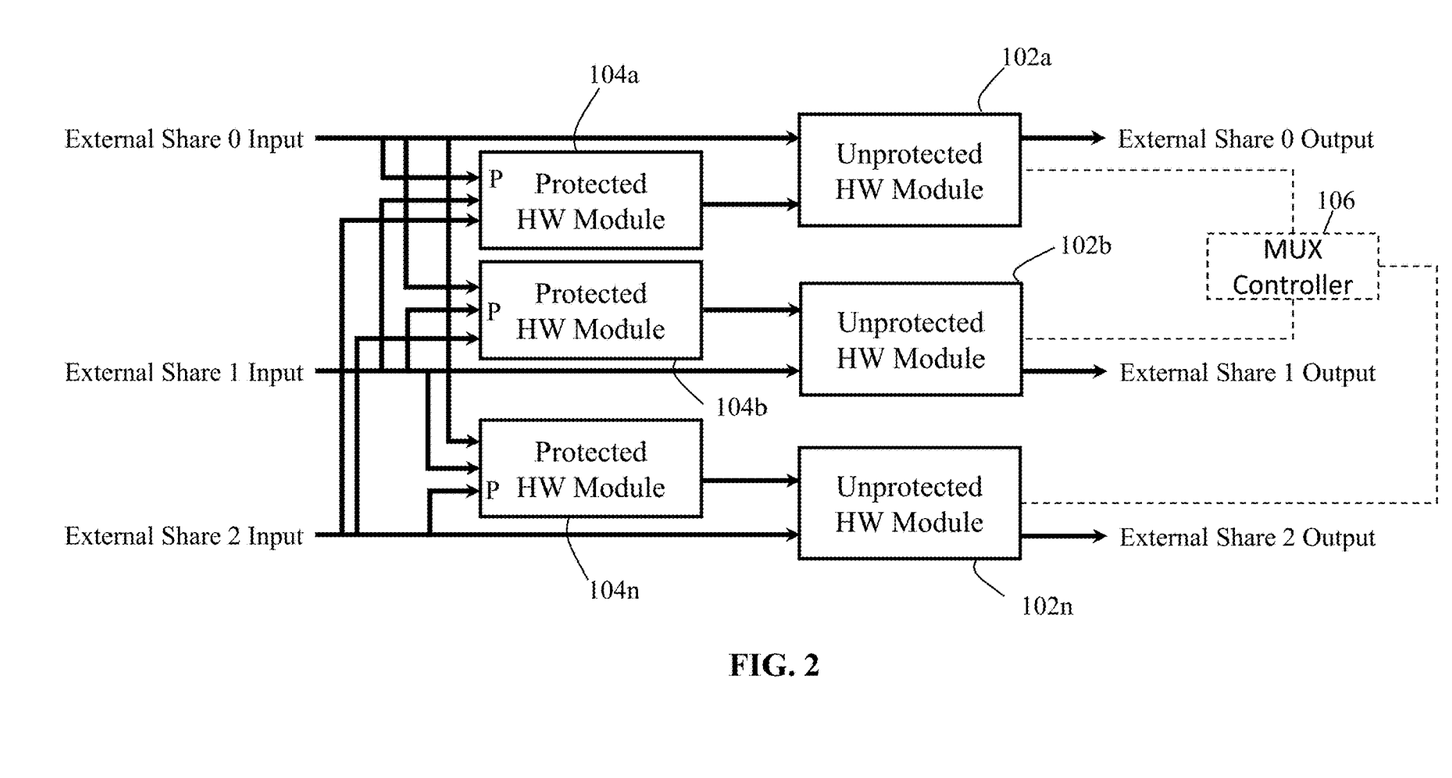
FIG. 2 is a diagram depicting the top-level view of a three-share system in accordance with one embodiment of the present invention.
Figure 7:
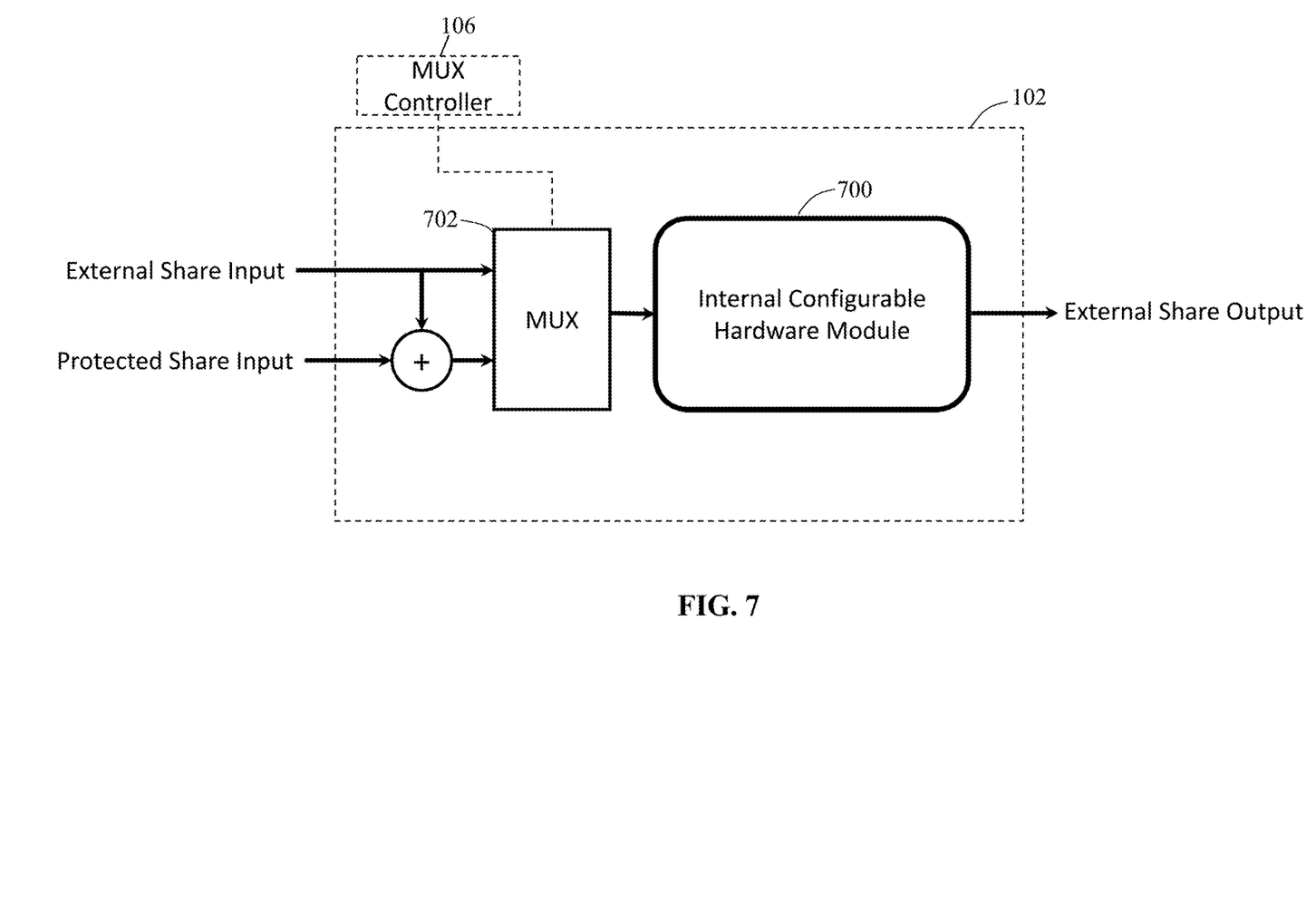
FIG. 7 depicts an exemplary unprotected hardware as illustrated in FIGS. 1-2.

More specifically and with reference to FIGS. 1-2 and FIG. 7, the two more unprotected hardware modules 102a-n each have an internal configurable hardware module 700 and are operably configured to receive an external share input forming part of at least two external input shares, receive a protected share input, and selectively, through a multiplexor 702, transmit the external share input or transmit a summation of the external share input and the protected share input into the internal configurable hardware module 700 for computing a share output forming at least two side-channel protected output shares utilized in the crypto operation, wherein the crypto operation is preferably one of the following: SHA-3, Keccak, or their respective derivatives. SHA-3 is a set of cryptographic hashing algorithms standardized by NIST in FIPS202. Keccak is an operation used in SHA-3, and was also the prior name of SHA-3 prior to the standardization. There are several derivatives works on SHA-3 and Keccak such as the ones found in NIST SP 800-185.

With reference back to FIGS. 1-4, two or more protected hardware modules 104a-n can be seen with each having a primary data isolator 300 operably configured to receive the external share input forming part of the at least two external input shares to generate a primary isolated external input share (e.g., represented with line 306). A protected hardware module 104 also includes one or more secondary data isolators 302a-n operably configured to receive a respective one of the remaining shares for the at least two external input shares to generate a secondary isolated external input share (e.g., represented with line 308). The protected hardware module 104 also includes a protected arithmetic logic unit (ALU) 304 operably configured to receive the primary isolated external input share and the one or more secondary isolated external input share(s) and compute a protected share input (represented with line 308). Without the data isolators 300, 302a, the transferred data may leak, which is problematic for side channel protection purposes.

Said another way, the hardware architecture includes a set of at least two unprotected hardware modules 102a-n that are pivotal in the system's architecture. The system's architecture also includes an internal configurable hardware module 700, wherein unprotected hardware modules are configured to receive an external input share from the at least two external input shares. In addition to receiving an external input share, these unprotected hardware modules 102a-n are equipped to receive a protected input share (represented with line 108). A crucial aspect of their functionality involves a multiplexor 702, which can either transmit the external input share directly or transmit a summation of the external input share with the protected input share. This processed data is then funneled into the internal configurable hardware module 700, where it undergoes computation to produce an external share output forming at least two external output shares.

The architecture's two or more protected hardware modules 104a-n are equipped with a primary data isolator 300 that receives an external input share from the at least two external input shares and generates a primary isolated external input share 306. The protected hardware module also incorporates at least one secondary data isolator 302 tasked with receiving and isolating a respective share from the remaining shares among the at least two external input shares, thereby generating at least one secondary isolated external input share 308. Finally, the protected hardware module has a protected arithmetic logic unit (ALU) 304 specifically configured to receive both the primary isolated external input share and the one or more secondary isolated external input share(s). Upon receiving the one or more secondary isolated external input share(s), the ALU 304 performs computations to produce the protected input share used in the two unprotected hardware modules 102a-n.

The internal configurable hardware module 700 is a customizable hardware module that can be designed according to the end-user needs. For example, the module 700 can be customized to perform the following: Pass the input data to the output directly, pass the input data temporarily to a memory unit before passing it the output, perform an operation on the input data, input data temporarily held in the memory unit, or both before passing the result to the output or memory unit.

In accordance with another feature, the system can operate in a protected mode. The system implements and utilizes an electronic controller 106 communicatively coupled to the multiplexor 702 of the at least two unprotected hardware modules 102a-n, as best seen exemplified in FIG. 7. The electronic controller 106 is operably configured to activate a protected mode causing selective transmission of the external share input directly into the internal configurable hardware module 700 or transmission of the summation of the external share input and the protected share input into the internal configurable hardware module 700. Further, the at least two external input shares are at least two independent input data and the at least two side-channel protected output shares are at least two non-side-channel protected output data. The electronic controller 106 is communicatively coupled to the multiplexor 702 of the at least two unprotected hardware modules 702 and is also operably configured to activate an unprotected mode causing transmission of the external share input directly into the internal configurable hardware module 700.

Said differently, each of the at least external input shares receive a share of a sensitive external input data. The method by which the sensitive external input data is split into shares is beyond the scope of this invention, but, importantly, the system always receives external input shares, the summation of which is always a sensitive external input data. The at least two external output shares represent shares of a side-channel protected external output data. In the "protected" mode, an electronic controller 106 which is communicatively coupled to the multiplexor 702 of the at least two unprotected hardware modules 102a-n is configured, depending on the type of side-channel protected operation, to either transmit the external input share directly into the internal configurable hardware module 700 or transmit summation of the external input share and the protected input share into the internal configurable hardware module 700.

As an example of type of side-channel protected operation, a side-channel protected multiplication operation requires the transmission of the summation of the external input share and the protected input share, while a side-channel protected addition operation or side-channel bit-manipulation operation, such as rotating bits in the input data, requires transmission the external input share directly.

In the "unprotected" mode, each of the at least external input shares receives two independent external input data, which do not require side-channel countermeasures. The at least two external output shares represent two independent non-side-channel protected external output data. In other words, the system can be seen as at least two independent systems each receiving one input data and transmitting one non-side-channel protected output data.

The system can achieve this behavior by configuring the electronic controller 106 which is communicatively coupled to the multiplexor 702 of the at least two unprotected hardware modules 102a-n to always transmit the external input share directly into the internal configurable hardware module 700. The internal configurable hardware module 700 may an unprotected ALU operably configured to perform the following operations: XOR, BITCLEAR, ROTL64. The BITCLEAR operation takes two inputs a and b and produces an output such that the result is a AND NOT b where the AND operation is as described previously and the NOT b operation inverts all the bits of b. The ROTL64 operation performs a variable left rotation on a 64-bit data.

Figure 3:
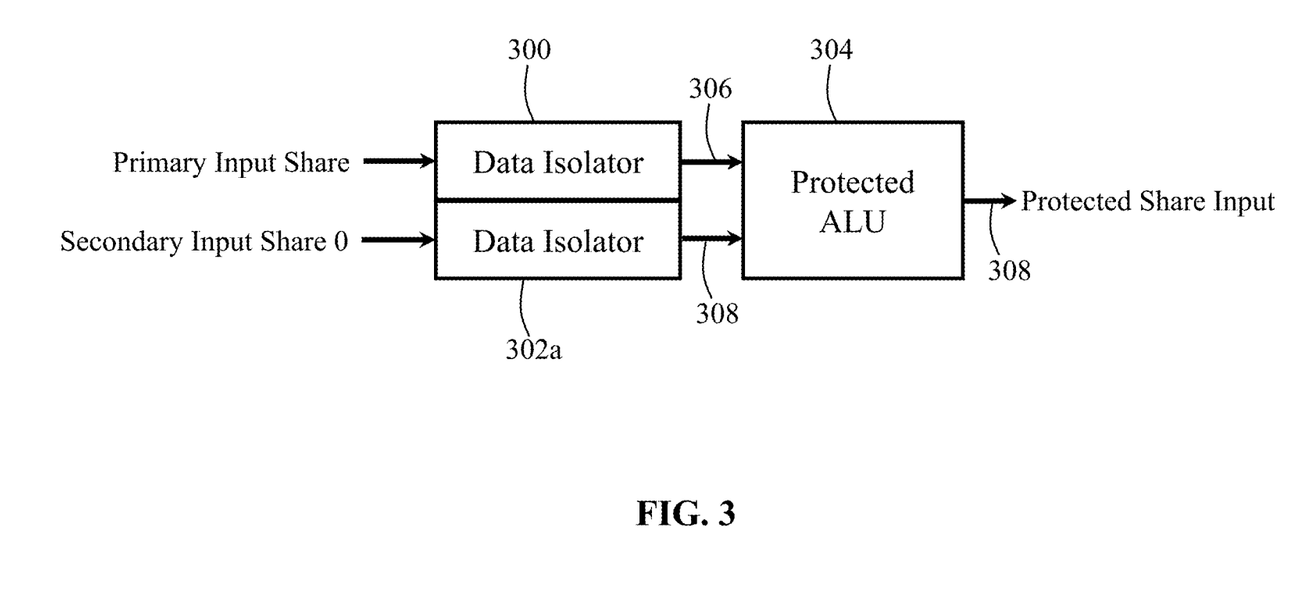
FIG. 3 depicts an exemplary protected hardware module as illustrated in FIG. 1.
Figure 5:
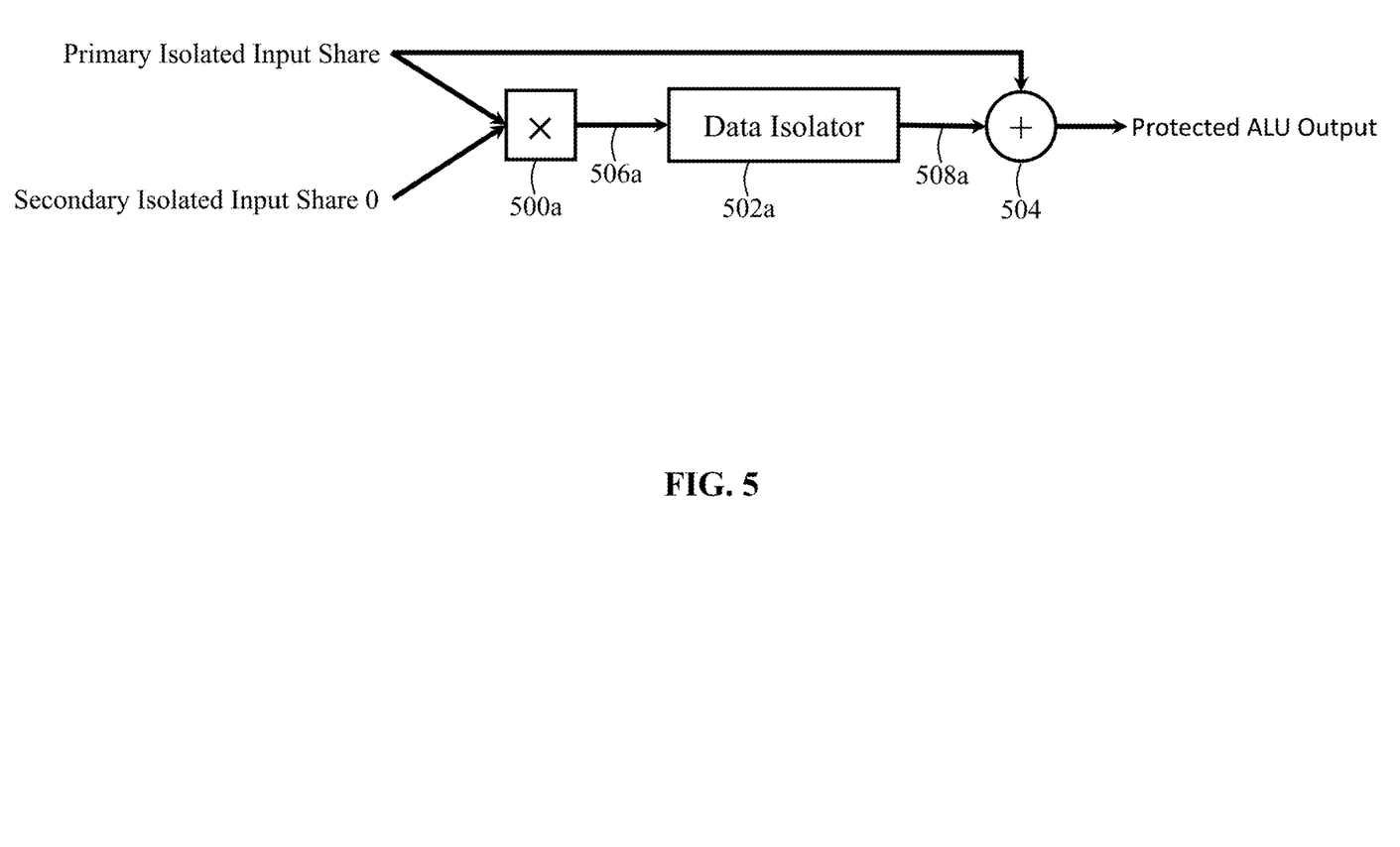
FIG. 5 depicts an exemplary protected ALU as illustrated in FIG. 1.

In accordance with another feature and with reference to FIG. 3 and FIG. 5 as an example, the protected ALU 304 can be designed using three different modules. First, at least one multiplication module 500a-n are operably configured to receive the primary isolated external input share and one of the at least one secondary isolated input share and computes the multiplication operation on these two inputs to produce an ALU multiplied share 506a-n. Second, at least one ALU data isolator 502a-n are operably configured to receive the ALU multiplied share 506a-n and generate the ALU isolated multiplied share 508a-n. Third, a summation module 504 is operably configured to receive the primary isolated external input share and the ALU isolated multiplied share 508a-n and generate the protected input share. Said another way, the protected ALU includes one or more multiplication module(s) 500a-n operably configured to receive the primary isolated external input share and the secondary isolated external input share and compute an ALU multiplied share 506a-n, one or more ALU data isolator(s) 502a-n operably configured to pass through the ALU multiplied share 506a-n to generate ALU isolated multiplied share 508a-n, and at least one summation module 504 operably configured to receive the primary isolated external input share and the ALU isolated multiplied share 508a-n to generate the protected share input. The one or more multiplication module(s) 500a-n may be an AND operation (e.g., $GF(2^1)$ multiplication) and the summation module 504 may be an XOR operation.

FIGS. 1-2 show the top-level view of a two-share and three-share systems, respectively. The figures show how the external input shares, the protected hardware modules 104a-n, the unprotected hardware modules 102a-n, and the external output shares are interconnected.

Figure 4:
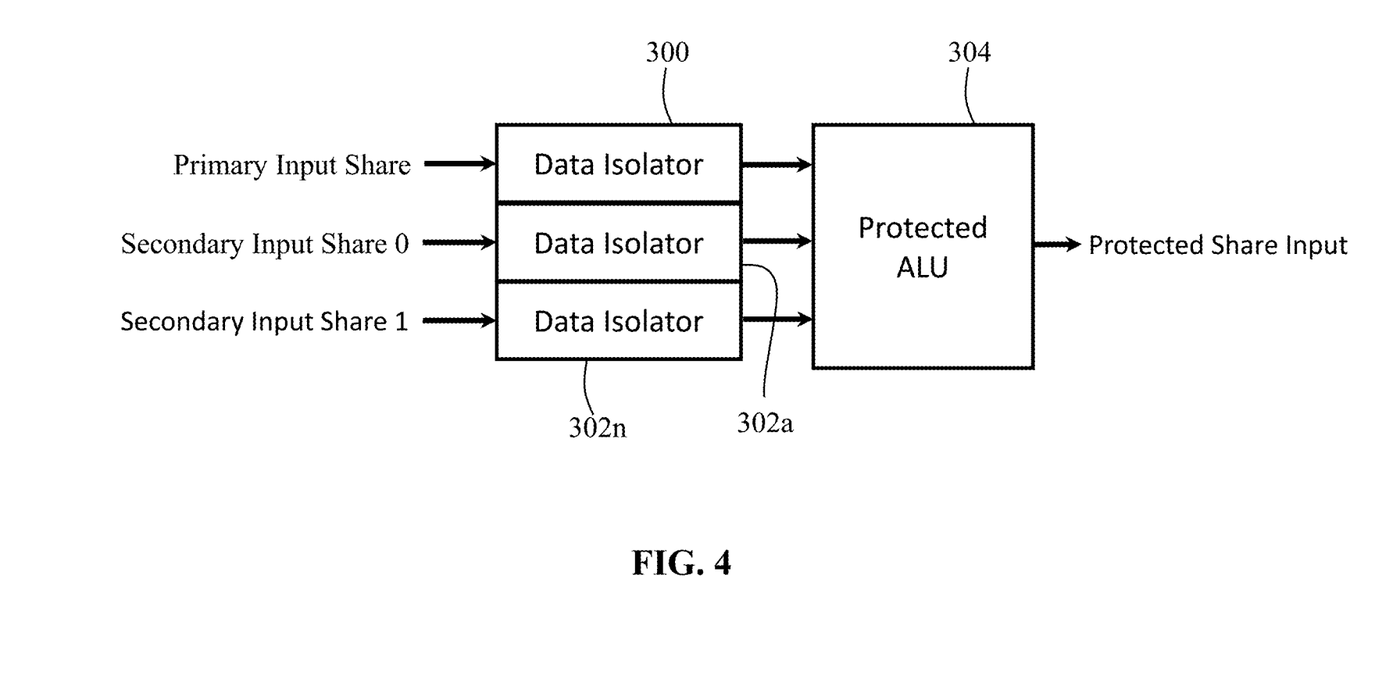
FIG. 4 depicts an exemplary protected hardware module as illustrated in FIG. 2.

FIGS. 3-4 show the internals of the two-share and three-share protected hardware module 104a-n, respectively. The figures show how the primary input share, the primary data isolator 300, the at least one secondary input share, the at least one secondary data isolator 302a-n, the protected ALU 304, and the protected input share are interconnected.

Figure 6:
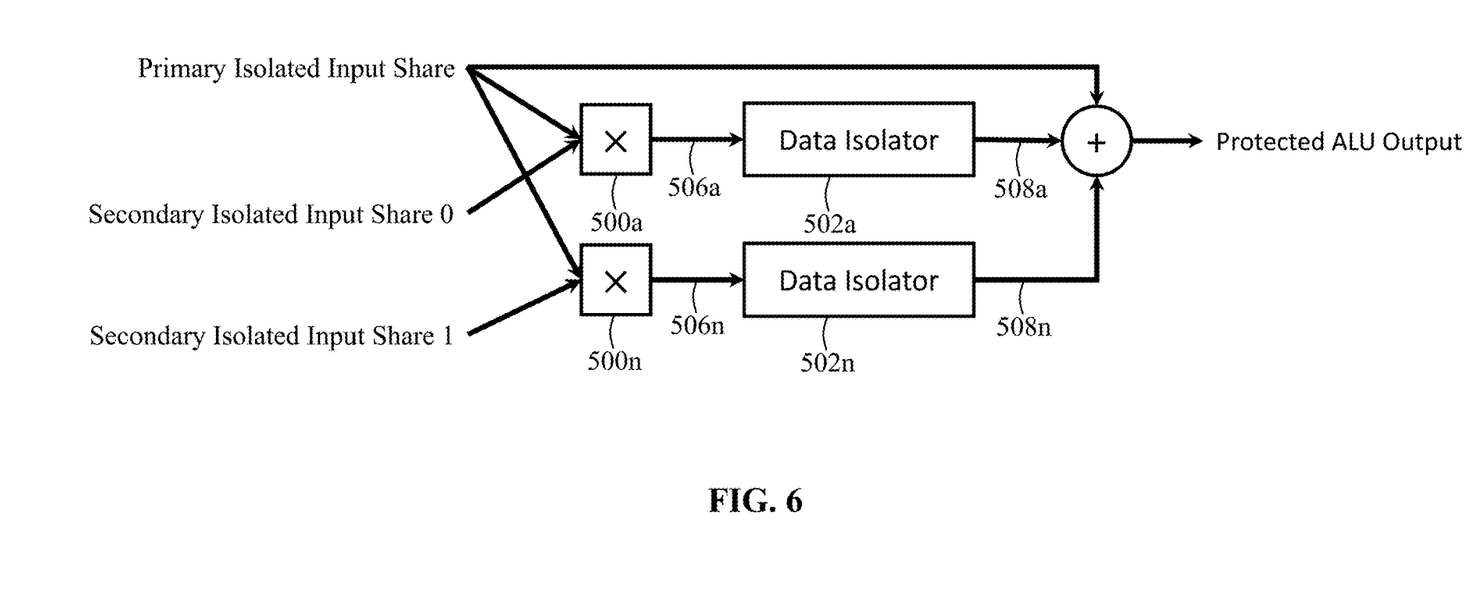
FIG. 6 depicts an exemplary protected ALU as illustrated in FIG. 2.

FIGS. 5-6 show the internals of the respective two-share and three-share protected ALU 304 in a feature of this invention. The figures show how the primary isolated input share, the at least one isolated input shares, the at least one multiplication module 500a-n, the at least one ALU data isolator 502a-n, the summation module 504, and the protected ALU output are interconnected.

FIG. 7 shows the internals of the unprotected hardware module 102a-n. The figure shows how the external share input, the protected share input, the multiplexor 702, the internal configurable hardware module 700 and the external output share are interconnected.

The invention can be used in very low-power and low-silicon footprint computer systems. This is achieved since the system stores minimal data internally and since there are very low number of operations. Another unique feature of the above-described system is the ability to perform side-channel protected operations and non-side-channel protected operations in one design through the usage of a controller 106.

The present invention also be described as a computer-based method of performing a crypto operation and selectively protecting against side-channel attacks comprising the steps of transmitting a first external share input to a multiplexor of a first unprotected hardware module 102a, the first unprotected hardware module 102a having an internal configurable hardware module 600. Next, the process may include transmitting a second external share input to a multiplexor of a second unprotected hardware module 102n, the second unprotected hardware module 102n having an internal configurable hardware module 600 and then transmitting the first external share input to a primary data isolator 300 of a first protected hardware module 104a generating a primary isolated external input share, transmitting the second external share input to a secondary data isolator 302a of the first protected hardware module 104a generating a secondary isolated external input share, and computing a first protected share input with a protected arithmetic logic unit (ALU) 304 of the first protected hardware module 104a based on the primary isolated external input share and the secondary isolated external input share. Thereafter, the process may include transmitting the second external share input to a primary data isolator 300 of a second protected hardware module 104n generating a primary isolated external input share, transmitting the first external share input to a secondary data isolator 302a of the second protected hardware module 104n generating a secondary isolated external input share, and computing a second protected share input with a protected ALU 304 of the second protected hardware module 104n based on the primary isolated external input share generated in the second protected hardware module 104n and the secondary isolated external input share generated in the second protected hardware module 104n.

Further, the process may continue on to the next step of initiating a protected mode utilizing the multiplexor 900 of the first unprotected hardware module 102a to either transmit the first external share input into the internal configurable hardware module 600 for computing a first share output or transmit a summation of the first external share input and the first protected share input into the internal configurable hardware module 600 for computing the first share output and the multiplexor 900 of the second unprotected hardware module 102n to either transmit the second external share input into the internal configurable hardware module 600 of the second unprotected hardware module 102n for computing a second share output or transmit a summation of the second external share input and the second protected share input into the internal configurable hardware module 600 of the second unprotected hardware module 102n for computing the second share output. The process may continue on to utilizing the first and second share outputs as two side-channel protected output shares in the crypto operation.

The process may also include the steps of utilizing an electronic controller 106 for initiating the protected mode by communicating a signal to the multiplexor 900 of the first unprotected hardware module 102a and a signal to the multiplexor 900 of the second unprotected hardware module 102n. Further the process may include initiating an unprotected mode utilizing the multiplexor 900 of the first unprotected hardware module 102a to transmit the first external share input directly into the internal configurable hardware module 600 for computing the first share output and the multiplexor 900 of the second unprotected hardware module 102n to transmit the second external share input directly into the internal configurable hardware module 600 of the second unprotected hardware module 102n for computing the second share output, wherein the first and second external share inputs are two independent input data and the first and second share outputs are two non-side-channel protected output data.

The process may also include computing an ALU multiplied share 506a with the primary isolated external input share in the first protected hardware module 104a and the secondary isolated external input share in a first multiplication module 500a in the protected arithmetic logic unit (ALU) 304 of the first protected hardware module 104a, generating an ALU isolated multiplied share 508a with an ALU data isolator 502a in the protected arithmetic logic unit (ALU) 304 of the first protected hardware module 104a and utilizing the ALU multiplied share 506a generated in the first protected hardware module 104a, and summing the primary isolated external input share generated in the first protected hardware module 104a and the ALU isolated multiplied share 508a generated in the first protected hardware module 104a to generate the first protected share input and computing an ALU multiplied share 506a with the primary isolated external input share in the second protected hardware module 104n and the secondary isolated external input share in a first multiplication module 500a in the protected arithmetic logic unit (ALU) 304 of the second protected hardware module 104n, generating an ALU isolated multiplied share 508a with an ALU data isolator 502a in the protected arithmetic logic unit (ALU) 304 of the second protected hardware module 104n and utilizing the ALU multiplied share 506a generated in the second protected hardware module 104n, and summing the primary isolated external input share generated in the second protected hardware module 104n and the ALU isolated multiplied share 508a generated in the second protected hardware module 104n to generate the second protected share input.

Although a specific order of executing the above-referenced process steps has been disclosed, the order of executing the steps may be changed relative to the order shown in certain embodiments. Also, two or more steps described or shown as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A computer processing system configured to perform a crypto operation and selectively protect against side-channel attacks comprising:
    at least two unprotected hardware modules each having an internal configurable hardware module, each having a multiplexor, and each operably configured to:
    receive an external share input forming part of at least two external input shares;
    receive a protected share input; and
    selectively, through the multiplexor configured to receive one of the at least two external input shares, transmit the external share input or transmit a summation of the external share input and the protected share input into the internal configurable hardware module for computing a share output forming at least two side-channel protected output shares utilized in the crypto operation; and
    at least two protected hardware modules each having:
        a primary data isolator operably configured to receive the external share input forming part of the at least two external input shares to generate a primary isolated external input share;
        at least one secondary data isolator operably configured to receive a respective one of remaining shares for the at least two external input shares to generate a secondary isolated external input share; and
        a protected arithmetic logic unit (ALU) operably configured to receive the primary isolated external input share and the secondary isolated external input shares and compute the protected share input.

2. The computer processing system according to claim 1, further comprising:
    an electronic controller communicatively coupled to the multiplexor of the at least two unprotected hardware modules and operably configured to activate a protected mode causing selective transmission of the external share input directly into the internal configurable hardware module or transmission of the summation of the external share input and the protected share input into the internal configurable hardware module.

3. The computer processing system according to claim 1, wherein the at least two external input shares are at least two independent input data and the at least two side-channel protected output shares are at least two non-side-channel protected output data, further comprising:
    an electronic controller communicatively coupled to the multiplexor of the at least two unprotected hardware modules and operably configured to activate an unprotected mode causing transmission of the external share input directly into the internal configurable hardware module.

4. The computer processing system according to claim 1, wherein the protected ALU further comprises:
    at least one multiplication module operably configured to receive the primary isolated external input share and the secondary isolated external input share and compute an ALU multiplied share;
    at least one ALU data isolator operably configured to pass through the ALU multiplied share to generate ALU isolated multiplied share; and
    a summation module operably configured to receive the primary isolated external input share and the ALU isolated multiplied share to generate the protected share input.

5. The computer processing system according to claim 4, wherein the at least one multiplication module is an AND operation and the summation module is an XOR operation.

6. The computer processing system according to claim 1, wherein the internal configurable hardware module further comprises:
    an unprotected ALU operably configured to perform the following operations: XOR, BITCLEAR, ROTL64.

7. The computer processing system according to claim 1, wherein the crypto operation is one of the following: SHA-3, Keccak, or their respective derivatives.

8. A computer-based method of performing a crypto operation and selectively protecting against side-channel attacks comprising the steps of:
    transmitting a first external share input to a multiplexor of a first unprotected hardware module, the first unprotected hardware module having an internal configurable hardware module;
    transmitting a second external share input to a multiplexor of a second unprotected hardware module, the second unprotected hardware module having the internal configurable hardware module;
    transmitting the first external share input to a primary data isolator of a first protected hardware module generating a primary isolated external input share, transmitting the second external share input to a secondary data isolator of the first protected hardware module generating a secondary isolated external input share, and computing a first protected share input with a protected arithmetic logic unit (ALU) of the first protected hardware module based on the primary isolated external input share and the secondary isolated external input share;

transmitting the second external share input to a primary data isolator of a second protected hardware module generating a primary isolated external input share, transmitting the first external share input to the secondary data isolator of the second protected hardware module generating the secondary isolated external input share, and computing a second protected share input with a protected ALU of the second protected hardware module based on the primary isolated external input share generated in the second protected hardware module and the secondary isolated external input share generated in the second protected hardware module;

initiating a protected mode utilizing:

the multiplexor of the first unprotected hardware module to either transmit the first external share input into the internal configurable hardware module for computing a first share output or transmit a summation of the first external share input and the first protected share input into the internal configurable hardware module for computing the first share output; and the multiplexor of the second unprotected hardware module to either transmit the second external share input into the internal configurable hardware module of the second unprotected hardware module for computing a second share output or transmit a summation of the second external share input and the second protected share input into the internal configurable hardware module of the second unprotected hardware module for computing the second share output; and utilizing the first and second share outputs as two side-channel protected output shares in the crypto operation.

9. The method according to claim 8, further comprising:
utilizing an electronic controller for initiating the protected mode by communicating a signal to the multiplexor of the first unprotected hardware module and a signal to the multiplexor of the second unprotected hardware module.

10. The method according to claim 8, further comprising:
initiating an unprotected mode utilizing:

the multiplexor of the first unprotected hardware module to transmit the first external share input directly into the internal configurable hardware module for computing the first share output; and the multiplexor of the second unprotected hardware module to transmit the second external share input directly into the internal configurable hardware module of the second unprotected hardware module for computing the second share output, wherein the first and second external share inputs are two independent input data and the first and second share outputs are two non-side-channel protected output data.

11. The method according to claim 8, further comprising:

computing an ALU multiplied share with the primary isolated external input share in the first protected hardware module and the secondary isolated external input share in a first multiplication module in the protected ALU of the first protected hardware module, generating an ALU isolated multiplied share with an ALU data isolator in the protected ALU of the first protected hardware module and utilizing the ALU multiplied share generated in the first protected hardware module, and summing the primary isolated external input share generated in the first protected hardware module and the ALU isolated multiplied share generated in the first protected hardware module to generate the first protected share input; and computing an ALU multiplied share with the primary isolated external input share in the second protected hardware module and the secondary isolated external input share in a first multiplication module in the protected ALU of the second protected hardware module, generating an ALU isolated multiplied share with an ALU data isolator in the protected ALU of the second protected hardware module and utilizing the ALU multiplied share generated in the second protected hardware module, and summing the primary isolated external input share generated in the second protected hardware module and the ALU isolated multiplied share generated in the second protected hardware module to generate the second protected share input.

12. The method according to claim 11, wherein the at least one multiplication module is an AND operation and a summation module is an XOR operation.

13. The method according to claim 8, wherein the internal configurable hardware module further comprises:

an unprotected ALU operably configured to perform the following operations: XOR, BITCLEAR, ROTL64.

14. The method according to claim 8, wherein the crypto operation is one of the following: SHA-3, Keccak, or their respective derivatives.

* * * * *